United States Patent [19]

Elphingstone et al.

[11] 4,369,124

[45] Jan. 18, 1983

[54] HIGH VISCOSITY COMPLEXED AQUEOUS GELS AND METHODS AND ADDITIVES FOR FORMING SUCH GELS

[75] Inventors: Eugene A. Elphingstone; John M. Dees, both of Duncan, Okla.

[73] Assignee: Halliburton Company, Duncan, Okla.

[21] Appl. No.: 75,481

[22] Filed: Sep. 14, 1979

[51] Int. Cl.$^3$ .............................................. B01J 13/00
[52] U.S. Cl. .................................. 252/316; 106/208; 252/8.55 C; 252/8.55 R
[58] Field of Search .......................... 252/316, 8.55 R; 106/208

[56] References Cited

U.S. PATENT DOCUMENTS

| | | | |
|---|---|---|---|
| 2,610,900 | 9/1952 | Cross, Jr. | 302/66 |
| 2,686,085 | 8/1954 | Odell | 302/66 |
| 3,202,556 | 8/1965 | Chrisp | 149/20 |
| 3,215,634 | 11/1965 | Walker | 252/8.55 R X |
| 3,301,723 | 1/1967 | Chrisp | 149/20 |
| 3,347,599 | 10/1967 | Topper et al. | 302/66 |
| 3,400,984 | 9/1968 | Shellene et al. | 302/14 |
| 3,410,795 | 11/1968 | Blytas et al. | 210/33 |
| 3,615,794 | 10/1971 | Nimerick | 252/8.55 R X |
| 3,841,710 | 10/1974 | Boland et al. | 302/14 |
| 3,888,312 | 6/1975 | Tiner et al. | 106/308 |
| 3,937,283 | 2/1976 | Blauer et al. | 166/307 |
| 4,033,415 | 7/1977 | Holtmyer et al. | 166/308 |

OTHER PUBLICATIONS

DuPont Brochure D-5258, "Tyzor" Organic Titanates, publ. Jan. 1972, contents page, back page thereof, center spread, and pp. 1, 22–27, 45 and 46.

*Primary Examiner*—Richard D. Lovering
*Attorney, Agent, or Firm*—Robert A. Kent

[57] ABSTRACT

High viscosity complexed aqueous gels and methods and additives for forming such gels utilizing solid crystalline organic titanate complexing agents are provided. The organic titanate complexing agents react over broad pH and temperature ranges and the reaction rates thereof are controlled by the rate of dissolution of the agents.

9 Claims, No Drawings

HIGH VISCOSITY COMPLEXED AQUEOUS GELS AND METHODS AND ADDITIVES FOR FORMING SUCH GELS

High viscosity aqueous gels containing hydrated organic polymers crosslinked or complexed by metal containing complexing agents have been developed heretofore. Such complex aqueous gels have a variety of uses including, but not limited to, suspending explosive materials used in mining, drilling and other similar applications, carrying out production stimulation procedures in oil, gas and water wells, carrying out subterranean well completions, transporting proppant or other materials into desired areas in subterranean well formations, diverting fluids in subterranean well formations, and carrying out cleaning procedures such as in cleaning of tubular goods, production equipment and industrial equipment.

High viscosity aqueous gels are particularly suitable as treating fluids in carrying out subterranean well formation acidizing, fracturing and fracture acidizing procedures. The high viscosity of the treating fluids prevents acid therein from becoming prematurely spent and inactive, enables the development of wider fractures in fracturing and fracture acidizing procedures, permits better fluid loss control and increases the proppant or other particulated material carrying capacity of the treating fluids.

Hydrophilic organic polymers (hereinafter referred to as gelling agents) such as hydratable polysaccharides and hydratable synthetic polymers, e.g., polyacrylamide, have been widely used to form aqueous gels. Numerous solid metallic crosslinking or complexing agents have also been employed to complex the hydrated gelling agents thereby forming a highly viscous aqueous fluid. The metallic complexing agents used heretofore include antimony salts, aluminum salts, chromium salts, and certain organic titanates. However, all of such complexing agents are limited in their use in that specific conditions of pH, temperature, other chemicals, etc. are required for the complexing reaction between the complexing agent and the hydrated organic polymers utilized to take place. For example, antimony complexing agents require that the aqueous gel have a specific pH and temperature before the complexing reaction takes place. Other metallic complexing agents such as chromium salts require oxidation-reduction for crosslinking. In addition, heretofore used complexing agents require separate mixing with the aqueous gel formed after the hydrated organic polymer or polymers utilized have been hydrated thereby requiring the use of elaborate mixing procedures and equipment for preparing the desired high viscosity complexed aqueous gels.

By the present invention a solid crystalline complexing agent is provided which reacts with aqueous gels containing hydrated organic polymers such as polysaccharides and polyacrylamides to form the aqueous gel into a high viscosity complexed aqueous fluid over a broad range of pH and temperature conditions. In addition, by the present invention solid additives are provided containing one or more hydratable organic polymers and the aforesaid complexing agent which can be combined directly with an aqueous fluid to form a highly viscous complexed aqueous gel at a desired pH and/or temperature. High viscosity complexed aqueous gels and methods of forming such gels utilizing the complexing agents and additives of this invention are also provided.

The complexing agents of this invention are solid crystalline materials comprised of organic titanate monomers, homopolymers of such monomers and mixtures of such monomers and homopolymers, the monomers having the following general formula:

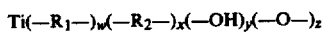

wherein:
R$_1$ is a bidentate organic ligand having one covalent bond and one coordinate covalent bond and having from 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers, α, β and γ sulfur containing groups, and α, β and γ amines;

R$_2$ is a monodentate organic ligand having from 1 to 18 carbon atoms selected from the group consisting of alkoxy, aryloxy and other hydroxy organic groups;

w is an integer in the range of from 1 to 4;

x is 0 or an integer in the range of from 1 to 3;

y is 0 or an integer in the range of from 1 to 3; and z is 0 or an integer in the range of from 1 to 3.

Examples of R$_1$ ligands which can be present in the organic titanate monomer are 2,2′,2″ nitrilodiethanol monoethoxide, acetylacetone-enolate and ammonium propanate-2-oxide. Examples of R$_2$ groups which can be present in the monomer are methoxy, ethoxy, propoxy, isopropoxy, butoxy, phenoxy and octadecoxy. Of these, methoxy, butoxy and isopropoxy are preferred with isopropoxy being the most preferred.

A more preferred complexing agent of the present invention is a solid crystalline material comprised of organic titanate monomers, homopolymers of such monomers and mixtures of such monomers and homopolymers, the monomers having the general formula:

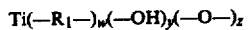

wherein:
R$_1$ is a group of the type described above; w is an integer of from 1 to 2; y is 0 to 3; and z is 0 to 3. Examples of such monomers are titanium bis [2,2′,2″ nitrilodiethanol monoethoxide] dihydroxide, titanium bis acetylacetone-enolate dihydroxide, and titanium bis [ammonium propanate-2-oxide] dihydroxide. Of these, titanium bis acetylacetone-enolate dihydroxide is the most preferred.

The most preferred complexing agent of the present invention is comprised of an organic titanate monomer, homopolymers of such monomer and mixtures thereof wherein said monomer is titanium bis acetylacetone-enolate dihydroxide.

The solid crystalline complexing agents of this invention can be prepared in various ways. For example, a tetra-alkoxy titanate can be reacted with an organic ketone, ester, amine or alcohol to produce a reaction product which when hydrolyzed forms the solid crystalline organic titanate complexing agent of this invention. For example, titanium (IV) tetraisopropoxide can be reacted with acetylacetone in a 1:2 mole ratio to form titanium bis acetylacetone-enolate bis isopropoxide. This reaction product can then be combined with excess water at room temperature with moderate agitation to yield the organic titanate complexing agent of this invention as a precipitate. When dried, the precipitate is a white to yellow powder, crystalline in nature.

An alternate procedure which can be utilized to form the organic titanate complexing agents of this invention is to react a titanium tetrahalide with an organic acetone, acetate, amine or alcohol in the presence of water and a base. For example, titanium tetrachloride can be reacted with acetylacetone in a 1:1 mole ratio in excess water and a base for neutralization to form the solid organic titanate.

As indicated above, the complexing agents of this invention react with hydrated gelling agents to complex such gelling agents and form a highly viscous complexed aqueous gel over a broad pH and temperature range, i.e., at a pH in the range of from about 3 to about 12 and at a temperature in the range of from about 40° F. to about 400° F., and preferably up to about 100° to 120° F. Solid hydratable gelling agents which are preferred for use in accordance with this invention are hydratable polysaccharides and hydratable synthetic polymers such as polyacrylamides. Particularly preferred hydratable polysaccharides are gelactomannan gums and derivatives thereof, glucomannan gums and derivatives thereof, and cellulose derivatives. Examples of such compounds are guar gum, locust bean gum, karaya gum, sodium carboxymethylguar, hydroxyethylguar, sodium carboxymethylhydroxyethylguar, hydroxypropylguar, sodium carboxymethylhydroxypropylcellulose, sodium carboxyethylhydroxyethylcellulose, and hydroxyethylcellulose. The hydroxyethylcellulose derivative used as gelling agents should be those having between 0.5 and about 10 moles of ethylene oxide per anhydroglucose unit. The most preferred gelling agent for use in accordance with this invention is hydroxypropylguar.

Because the complexing agent of this invention is a crystalline material of fine particle size, it can be uniformly mixed with one or more of the solid gelling agents described above to form a solid powder additive which can be combined directly with an aqueous fluid, either in a batch or continuous process, to form a highly viscous complexed aqueous gel. The organic titanate complexing agent is dissolved in aqueous fluids at a slower rate than the gelling agents described above thereby allowing the gelling agents to hydrate prior to being complexed by the complexing agent when the gelling agent and complexing agent are added to an aqueous fluid simultaneously. In addition to the organic titanate complexing agent and one or more gelling agents of the type described above, the additives of this invention for forming high viscosity complexed aqueous gels can include a variety of other solid chemicals to bring about desired results. For example, breakers for the complexed gels produced by the additives can be included in the additives such as oxidizing agents, enzymes, acids and mixtures of such compounds. Examples of particularly suitable oxidizing agents are sodium persulfate and ammonium persulfate. Examples of suitable enzymes which can be used are $\alpha$ and $\beta$ amylases, amyloglucosidase, aligoglucosidase, invertase, maltase, cellulase and hemicellulase. An example of a suitable acid is fumaric acid. Of these, a mixture of sodium persulfate, hemicellulase and cellulase is perferred. Other solid additives such as buffers, surface active agents, fluid loss control chemicals, etc., can also be included.

A preferred solid additive for forming the high viscosity complexed aqueous gels of this invention when combined with an aqueous fluid is comprised of a mixture of a gelling agent selected from the group consisting of solid hydratable polysaccharides, hydratable synthetic polymers and mixtures thereof, and a solid complexing agent comprised of organic titanate monomers, homopolymers of such monomers and mixtures thereof, the monomers having the following general formula:

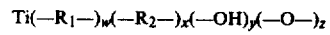

$$Ti(-R_1-)_w(-R_2-)_x(-OH)_y(-O-)_z$$

wherein:
R$_1$ is a bidentate organic ligand having one covalent bond and one coordinate covalent bond and having from 2 to 18 carbon atoms selected from the group consisting of $\alpha$, $\beta$ and $\gamma$ hydroxy acids, $\alpha$, $\beta$ and $\gamma$ hydroxy ketones, $\alpha$, $\beta$ and $\gamma$ hydroxy ethers and $\alpha$, $\beta$ and $\gamma$ hydroxy sulfur containing groups;

R$_2$ is a monodentate organic ligand having from 1 to 18 carbon atoms selected from the group consisting of alkoxy, aryloxy and other hydroxy organic groups;

w is an integer in the range of from 1 to 4;
x is 0 or an integer in the range of from 1 to 3;
y is 0 or an integer in the range of from 1 to 3; and
z is 0 or an integer in the range of from 1 to 3.

A more preferred additive of this invention is comprised of a mixture of a solid gelling agent selected from the group consisting of sodium carboxymethylhydroxyethylcellulose, guar, hydroxypropylguar, hydratable polyacrylamide and mixtures thereof, and a solid complexing agent comprised of organic titanate monomers, homopolymers and mixtures of such monomers and homopolymers, the monomers having the following general formula:

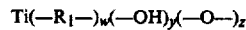

$$Ti(-R_1-)_w(-OH)_y(-O-)_z$$

wherein:
R$_1$ is a bidentate organic ligand having one covalent bond and one coordinate covalent bond and having from 2 to 18 carbon atoms selected from the group consisting of $\alpha$, $\beta$ and $\gamma$ hydroxy acids, $\alpha$, $\beta$ and $\gamma$ hydroxy esters, $\alpha$, $\beta$ and $\gamma$ hydroxy aldehydes, $\alpha$, $\beta$ and $\gamma$ hydroxy ketones and $\alpha$, $\beta$ and $\gamma$ hydroxy ethers, and $\alpha$, $\beta$ and $\gamma$ hydroxy sulfur containing groups;

w is an integer from 1 to 2;
y is 0 to 3; and
z is 0 to 3.

The most preferred additive of this invention comprises a mixture of solid hydroxypropylguar gelling agent and a solid complexing agent comprised of an organic titanate monomer, homopolymers of such monomer and mixtures thereof wherein said monomer is titanium bis acetylacetone-enolate dihydroxide.

The solid additives of this invention for forming highly viscous complexed aqueous gels when combined with an aqueous fluid preferably include complexing agent and gelling agent in amounts whereby the weight ratio of complexing agent to gelling agent is in the range of from about 0.01 to about 0.20. A more preferred additive contains complexing agent to gelling agent in a weight ratio in the range of from about 0.02 to about 0.10, and the most preferred additive contains complexing agent to gelling agent in a weight ratio of 0.06.

In forming a high viscosity complexed aqueous gel using the complexing agents of this invention, the complexing agent can be combined with an aqueous gel containing one or more hydrated polysaccharides and/or hydrated synthetic polymers having a pH in the range of from about 3 to about 12 at a temperature in the range of from about 40° F. to about 400° F. and preferably up to about 100° to 120° F. The mixture is agitated and as the complexing agent dissolved it reacts with the hydrated polymers contained in the aqueous gel to form a highly viscous complexed aqueous gel. Preferably, the complexing agent is combined with the aqueous gel in an amount whereby the weight ratio of complexing agent to gelling agent contained in the aqueous gel is in the range of from about 0.01 to about 0.20, most preferably, in the range of from about 0.04 to about 0.08.

In forming a complexed aqueous gel using the solid additives of the present invention, the additives are combined with an aqueous fluid having a pH in the range of from about 3 to about 12 and a temperature of from about 40° F. to about 400° F. and preferably up to about 100° to 120° F., while agitating the resultant mixture. The solid hydratable gelling agent in the additive is dissolved in the aqueous fluid at a comparatively rapid rate whereby the gelling agent is hydrated followed by the dissolution of the complexing agent and the complexing reaction between the gelling agent and complexing agent. As indicated above, the complexing agents and additives can be combined with the aqueous gel and aqueous fluid respectively in a static condition or they can be continuously combined while the resulting mixture is being pumped to a point of use, e.g., through a well bore and into a subterranean formation. The solid additives are preferably combined with the aqueous fluid in an amount in the range of from about 0.25% by weight to about 1.5% by weight, most preferably in an amount in the range of from about 0.5% to about 1.0% by weight.

The high viscosity complexed aqueous gels of this invention are comprised of water, a gelling agent selected from the group consisting of hydratable polysaccharides, hydratable synthetic polymers and mixtures of such gelling agents present in the aqueous gel in an amount in the range of from about 0.2 to about 1.35% by weight thereof, and a complexing agent comprised of organic titanate monomers, homopolymers of such monomers and mixtures thereof, the monomers having the general formula:

$$Ti(-R_1-)_w(-R_2-)_x(-OH)_y(-O-)_z$$

wherein:
R$_1$ is a bidentate organic ligand having one covalent bond and one coordinate covalent bond and having from 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers and α, β and γ sulfur containing groups;
R$_2$ is a monodentate organic ligand having from 1 to 18 carbon atoms selected from the group consisting of alkoxy, aryloxy and other hydroxy organic groups
w is an integer in the range of from 1 to 4;
x is 0 or an integer in the range of from 1 to 3;
y is 0 or an integer in the range of from 1 to 3; and
z is 0 or an integer in the range of from 1 to 3;
said complexing agent being present in said aqueous gel in an amount in the range of from about 0.01% to about 0.2% by weight.

More preferably, the complexing agent in the above-described high viscosity complexed aqueous gel is comprised of organic titanate monomers, homopolymers of said monomers and mixtures thereof, the monomers having the general formula:

$$Ti(-R_1-)_w(-OH)_y(-O-)_z$$

wherein:
R$_1$ is a bidentate organic ligand having one covalent bond and one coordinate covalent bond and having 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers and α, β and γ hydroxy sulfur containing groups;
w is an integer from 1 to 2;
y is 0–3; and
z is 0–3.

The most preferred high viscosity complexed aqueous gel of this invention is comprised of water; hydroxypropylguar gelling agent present in said aqueous gel in the amount of 0.72% by weight of said aqueous gel and a complexing agent comprised of an organic titanate monomer, homopolymers of such monomer and mixtures thereof wherein the monomer is titanium bis acetylacetone-enolate dihydroxide and the complexing agent is present in said aqueous gel in an amount of 0.043% by weight.

As will be understood by those skilled in the art, the high viscosity complexed aqueous gels of this invention can include other components to bring about desired properties such as secondary gel, gel breakers, buffers, surfactants, fluid loss additives, solid materials such as sand or other proppants, etc. As indicated above, because the complexing agent of this invention is a solid crystalline material, has limited solubility in aqueous fluids and reacts with gelling agents of the type described herein over a broad pH and temperature range, it is particularly suitable for forming highly viscous aqueous treating fluid utilized in subterranean well formation treatments. Further, the powdered solid additives of this invention for forming the highly viscous complexed gels when combined with an aqueous fluid are particularly suitable for use in preparing highly viscous treating fluids for carrying out subterranean well formation treatments in that the gelling agent and complexing agent compounds of the additives as well as other desired components can be premixed in dry solid form, stored in suitable containers, transported to an area of use and combined directly with an aqueous fluid in a batch or continuous manner.

In order to more clearly illustrate the present invention, the following examples are given.

EXAMPLE 1

In the laboratory, quatities of a complexing agent of this invention, namely, a solid mixture of titanium bis acetylacetoneenolate dihydroxide monomer and homopolymers of such monomer, are combined with a solid gelling agent mixture comprised of 91% by weight hydroxypropylguar, 5.5% by weight fumaric acid and 3.5% by weight sodium bicarbonate in the proportions indicated in Table I below. The resulting dry solid additives are combined with quantities of tap water in a Waring blender in the amounts indicated and at the temperatures given in Table I while mixing at a moderate speed. Each of the tests are conducted using the same Waring blender mixing speed, and the time required for the vortex produced by the blender to close and the gel produced therein to roll in the blender is recorded as the time required for a complexed gel to form. The pH of the gels produced is also determined. The results of these tests are given in Table I below.

TABLE I
COMPLEXED AQUEOUS GEL FORMATION USING SOLID GELLING AGENT - COMPLEXING AGENT ADDITIVES

| QUANTITY OF COMPLEXING AGENT, LBS/1000 GALLONS OF WATER | QUANTITY OF GELLING AGENT AND OTHER ADDITIVES USED, LBS/1000 GALLONS OF WATER | WATER TEMP., °F. | COMPLEX TIME, SECONDS | GEL pH |
|---|---|---|---|---|
| 5 | 50 | 60 | 405 | 5.07 |
| 5 | 50 | 100 | 180 | 5.28 |
| 3 | 50 | 60 | 540 | 5.11 |

EXAMPLE 2

The procedure of Example 1 is repeated except that tap water containing 2% potassium chloride is used at a temperature in the range of from 70° F. to 75° F. The pH of the complexed gels formed ranges from about 5 to about 7.

TABLE II
COMPLEXED AQUEOUS GEL FORMATION AT VARIOUS COMPLEXING AGENT CONCENTRATIONS

| QUANTITY OF COMPLEXING AGENT, LBS/1000 GALLONS OF WATER | QUANTITY OF GELLING AGENT AND OTHER ADDITIVES USED, LBS/1000 GALLONS OF WATER | COMPLEX TIME, SECONDS | OBSERVATIONS OF COMPLEXED GEL |
|---|---|---|---|
| 5 | 50 | 125 | CHUNKY COMPLEX |
| 4 | 50 | 135 | GOOD COMPLEX |
| 3 | 50 | 140 | GOOD COMPLEX |
| 2 | 50 | 205 | GOOD COMPLEX |
| 1 | 50 | 480 | GOOD COMPLEX |

From Table II it can be seen that good complexes are rapidly formed at complexing agent concentrations of from about 2 to about 4 lbs. per 1,000 gallons of water and gelling agent concentrations of 50 lbs. per 1,000 gallons of water.

EXAMPLE 3

The procedure described in Example 1 is repeated except that additives containing 50 parts by weight of the gelling agent mixture and 4 parts by weight complexing agent are added to tap water containing 2% potassium chloride at various concentrations. The temperature of the water is in the range of from about 70° F. to about 75° F. and the pH of the resulting complexed gels ranges from about 5 to about 7. The results of these tests are shown in Table III below.

TABLE III
COMPLEXED AQUEOUS GEL FORMATION AT VARIOUS CONCENTRATIONS OF GELLING AGENT - COMPLEXING AGENT ADDITIVE

| QUANTITY OF GELLING AGENT - COMPLEXING AGENT ADDITIVE, LBS/1000 GALLONS OF WATER | COMPLEX TIME, SECONDS | OBSERVATIONS OF COMPLEXED GEL |
|---|---|---|
| 80 | 145 | GOOD COMPLEX |
| 60 | 175 | GOOD COMPLEX |
| 50 | 180 | GOOD COMPLEX |
| 40 | 240 | WEAK COMPLEX |
| 30 | 300 | WEAK COMPLEX |
| 20 | 300 | WEAK COMPLEX |

From Table III it can be seen that good complexes are rapidly formed at additive concentrations of from about 50 to about 80 lbs. of additive per 1,000 gallons of water used.

EXAMPLE 4

The procedure described in Example 3 is repeated except that tap water containing 10% sodium chloride is utilized. The results of these tests are given in Table IV below.

TABLE IV
COMPLEXED AQUEOUS GEL FORMATION AT VARIOUS CONCENTRATIONS OF GELLING AGENT - COMPLEXING AGENT ADDITIVE IN WATER CONTAINING 10% BY WEIGHT NaCl

| QUANTITY OF GELLING AGENT - COMPLEXING AGENT ADDITIVE, LBS/1000 GALLONS OF WATER | COMPLEX TIME, SECONDS | OBSERVATIONS OF COMPLEXED GEL |
|---|---|---|
| 80 | 105 | GOOD COMPLEX |
| 60 | 130 | GOOD COMPLEX |
| 50 | 150 | GOOD COMPLEX |
| 40 | 240 | WEAK COMPLEX |
| 30 | 240 | WEAK COMPLEX |
| 20 | 270 | WEAK COMPLEX |

From Table IV it can be seen that good complexes are rapidly formed in salt water at additive concentrations of from about 50 to about 80 lbs. per 1,000 gallons of water used.

EXAMPLE 5

The procedure described in Example 3 is repeated except that the additives contain 50 parts by weight of the gelling agent mixture and 3 parts by weight complexing agent. The results of these tests are shown in Table V below.

TABLE V
COMPLEXED AQUEOUS GEL FORMATION AT VARIOUS CONCENTRATIONS OF GELLING AGENT - COMPLEXING AGENT ADDITIVE IN WATER

| QUANTITY OF GELLING AGENT - COMPLEXING AGENT ADDITIVE, LBS/1000 GALLONS OF WATER | COMPLEX TIME, SECONDS | OBSERVATIONS OF COMPLEXED GEL |
|---|---|---|
| 80 | 210 | GOOD COMPLEX |
| 60 | 220 | GOOD COMPLEX |
| 50 | 200 | GOOD COMPLEX |
| 40 | 240 | WEAK COMPLEX |
| 30 | 240 | WEAK COMPLEX |
| 20 | 270 | WEAK COMPLEX |

From Table V it can be seen that good complexes are rapidly formed at additive concentrations of from about 50 to about 80 lbs. per 1,000 gallons of water. From a comparison of Tables IV and V it can be seen that 50 parts by weight gelling agent and 4 parts by weight complexing agent form good complexes more rapidly than those containing 50 parts by weight gelling agent and 3 parts by weight complexing agent.

EXAMPLE 6

The procedure described in Example 1 is repeated except that additives are prepared containing various quantities of complexing agent and the temperature of the water used is 40° F. The results of these tests are shown in Table VI below.

TABLE VI
COMPLEXED AQUEOUS GEL FORMATION AT VARIOUS CONCENTRATIONS OF COMPLEXING AGENT IN WATER AT 40° F.

| QUANTITY OF COMPLEXING AGENT, LBS/1000 GALLONS OF WATER | QUANTITY OF GELLING AGENT AND OTHER ADDITIVES USED, LB/1000 GALLONS OF WATER | COMPLEX TIME, SECONDS |
|---|---|---|
| 5 | 50 | 750 |
| 4 | 50 | 750 |
| 3 | 50 | 750 |

From Table VI it can be seen that the additives of this invention are effective in forming complexed aqueous gels at water temperatures of 40° F.

EXAMPLE 7

A solid additive of the present invention is prepared by blending 45 parts by weight hydroxypropylguar gelling agent with 5 parts by weight complexing agent, namely, a solid mixture of titanium bis acetylacetone-enolate dihydroxide monomers and homopolymers. Portions of tap water containing 1% potassium chloride are prepared at various pH levels by combining buffers therewith. The buffers used are mixtures of fumaric acid, sodium bicarbonate and sodium hydroxide. Portions of the additive are combined with the water in quantities of 50 pounds of additive per 1,000 gallons of water and the complex times are determined in accordance with the procedure given in Example 1. The results of these tests are given in Table VII below.

TABLE VII
COMPLEXED AQUEOUS GEL FORMATION AT VARIOUS pH LEVELS

| pH OF WATER | COMPLEX TIME, SECONDS | COMMENTS |
|---|---|---|
| 3.3 | 150 | |
| 4.1 | 135 | |
| 4.5 | 135 | |
| 7.1 | — | GEL NOT FORMED[1] |
| 7.6 | — | GEL NOT FORMED[1] |
| 9.14 | — | GEL NOT FORMED[1] |
| 7.6 | 12 | GELLING AGENT PREHYDRATED |
| 8.2 | 8 | GELLING AGENT PREHYDRATED |
| 9.3 | 9 | GELLING AGENT PREHYDRATED |

[1]Gelling agent will not hydrate in higher pH water.

From Table VII it can be seen that the complexed aqueous gels of this invention can be formed using water at various pH levels.

EXAMPLE 8

The procedure described in Example 1 is repeated except that various water temperatures are utilized. The results of these tests are given in Table VIII below.

TABLE VIII
COMPLEXED AQUEOUS GEL FORMATION AT VARIOUS TEMPERATURES

| QUANTITY OF COMPLEXING AGENT, LBS/1000 GALLONS OF WATER | QUANTITY OF GELLING AGENT, LBS/1000 GALLONS OF WATER | COMPLEX TIME, SECONDS | WATER TEMPERATURE, °F. |
|---|---|---|---|
| 5 | 50 | 120 | 72 |
| 5 | 50 | 150 | 40 |
| 5 | 50 | 50 | 110 |

From Table VIII it can be seen that the complexed aqueous gels of this invention can be formed over a broad temperature range.

EXAMPLE 9

An additive of the present invention is prepared comprised of 60 parts by weight of a gelling agent containing 91% by weight hydroxypropylguar, 5.5% by weight fumaric acid and 3.5% by weight sodium bicarbonate and 6 parts by weight of the complexing agent described in Example 1. The additive is combined with tap water containing .2% potassium chloride in the amount of 66 pounds per 1,000 gallons of water. The apparent viscosity of the complexed aqueous gel produced is determined at various temperatures using a Model 50A FANN viscometer with modified bob at 300 rpm. The results of these tests are given in Table IX below.

TABLE IX

VISCOSITY OF COMPLEXED AQUEOUS GEL

| TEMPERATURE, °F. | VISCOSITY[1], CP |
|---|---|
| 80 | 1000 |
| 100 | 1100 |
| 125 | 1100 |
| 150 | 1000 |
| 175 | 900 |
| 200 | 750 |
| 225 | 600 |
| 250 | 450 |
| 275 | 250 |
| 300 | 200 |
| 325 | 200 |
| 350 | 110 |
| 375 | 40 |
| 400 | 30 |

[1]Measured on a Model 50A FANN viscometer, 300 rpm, 400 psig. modified bob.

From Table IX it can be seen that the complexed aqueous gels of this invention are stable over a broad temperature range.

What is claimed is:

1. A solid additive for forming a high viscosity complexed aqueous gel when combined with water comprising:
   a solid gelling agent selected from the group consisting of hydratable polysaccharides and hydratable synthetic polymers; and
   a complexing agent selected from the group consisting organic titanate monomers, homopolymers of such monomers and mixtures thereof present in said solid additive in an amount whereby the weight ratio of complexing agent to gelling agent is in the range of from about 0.01 to about 0.2, the monomers having the general formula:

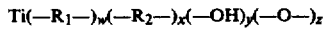
   $$Ti(-R_1-)_w(-R_2-)_x(-OH)_y(-O-)_z$$

wherein:
   $R_1$ is a bidentate organic ligand having one covalent bond and one one coordinate covalent bond and having from 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers, α, β and γ sulfur containing groups, and α, β and γ amines;
   $R_2$ is a monodentate organic ligand having from 1 to 18 carbon atoms selected from the group consisting of alkoxy, aryloxy and other hydroxy organic groups;
   w is an integer in the range of from 1 to 4;
   x is 0 or an integer in the range of from 1 to 3;
   y is 0 or an integer in the range of from 1 to 3; and
   z is 0 or an integer in the range of from 1 to 3.

2. The additive of claim 1 wherein said gelling agent is selected from the group consisting of guar, carboxymethylhydroxyethylcellulose, hydroxypropylguar and polyacrylamide, and said complexing agent is comprised of organic titanate monomers, homopolymers of said monomers and mixtures thereof, the monomers having the general formula:

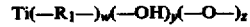
   $$Ti(-R_1-)_w(-OH)_y(-O-)_z$$

wherein:
   $R_1$ is a bidentate organic ligand having one covalent bond and one coordinate covalent bond and having from 1 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers, α, β and γ sulfur containing groups, and α, β and γ amines;
   w is an integer from 1 to 3;
   y is 0 to 3; and
   z is 0 to 3.

3. The solid additive of claim 1 wherein said organic titanate monomers are selected from the group consisting of titanium bis [2,2',2" nitrilodiethanol monoethoxide] dihydroxide, titanium bis acetylacetone-enolate dihydroxide and titanium bis dihydroxide.

4. The solid additive of claim 1 wherein said organic titanate monomer is titanium bis acetylacetone-enolate dihydroxide.

5. The additive of claim 1 wherein said gelling agent is hydroxypropylguar and said complexing agent is a solid mixture of titanium bis acetylacetone-enolate dihydroxide monomer and homopolymers of such monomer, and said gelling agent and complexing agent are present in said additive in amounts whereby the weight ratio of complexing agent to gelling agent is 0.06.

6. A method of forming a high viscosity complexed aqueous gel comprising the steps of:
   combining an additive with water to form said complexed aqueous gelled fluid, said additive being comprised of:
   a solid gelling agent selected from the group consisting of hydratable polysaccharides and hydratable synthetic polymers; and
   a complexing agent selected from the group consisting of organic titanate monomers, homopolymers of such monomers and mixtures thereof present in said additive in an amount whereby the weight ratio of complexing agent to gelling agent in said additive is in the range of from about 0.01 to about 0.2, the monomers having the general formula:

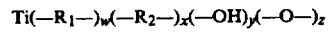
   $$Ti(-R_1-)_w(-R_2-)_x(-OH)_y(-O-)_z$$

wherein:
   $R_1$ is a bidentate organic ligand having one covalent bond and one one coordinate covalent bond and having from 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers, α, β and γ sulfur containing groups, and α, β and γ amines;
   $R_2$ is a monodentate organic ligand having from 1 to 18 carbon atoms selected from the group consisting of alkoxy, aryloxy and other hydroxy organic groups;
   w is an integer in the range of from 1 to 4;
   x is 0 or an integer in the range of from 1 to 3;
   y is 0 or an integer in the range of from 1 to 3; and
   z is 0 or an integer in the range of from 1 to 3.

7. The method of claim 6 wherein said gelling agent is selected from the group consisting of guar, carboxymethylhydroxyethylcellulose, hydroxypropylguar and polyacrylamide, and said complexing agent is comprised of organic titanate monomers, homopolymers of said monomers and mixtures thereof, the monomers having the general formula:

$$Ti(-R_1-)_w(-OH)_y(-O-)_z$$

wherein:
R$_1$ is a bidentate organic ligand having one covalent bond and one coordinate covalent bond and having from 2 to 18 carbon atoms selected from the group consisting of α, β and γ hydroxy acids, α, β and γ hydroxy esters, α, β and γ hydroxy aldehydes, α, β and γ hydroxy ketones, α, β and γ hydroxy ethers, α, β and γ sulfur containing groups, and α, β and γ amines;
w is an integer from 1 to 2;
y is 0 to 3; and
z is 0 to 3.

8. The method of claim 6 wherein said gelling agent is hydroxypropylguar and said complexing agent is a mixture of titanium bis acetylacetone-enolate dihydroxide monomers and homopolymers of said monomers.

9. The method of claim 6 wherein said gelling agent is hydroxypropylguar and said complexing agent is a solid mixture of titanium bis acetylacetone-enolate dihydroxide monomer and homopolymers of such monomer, and said gelling agent and complexing agent are present in said additive in amounts whereby the weight ratio of complexing agent to gelling agent is 0.06.

* * * * *